Dec. 4, 1934.  W. S. SEARLES  1,983,500
OPHTHALMIC MOUNTING
Filed Sept. 15, 1934
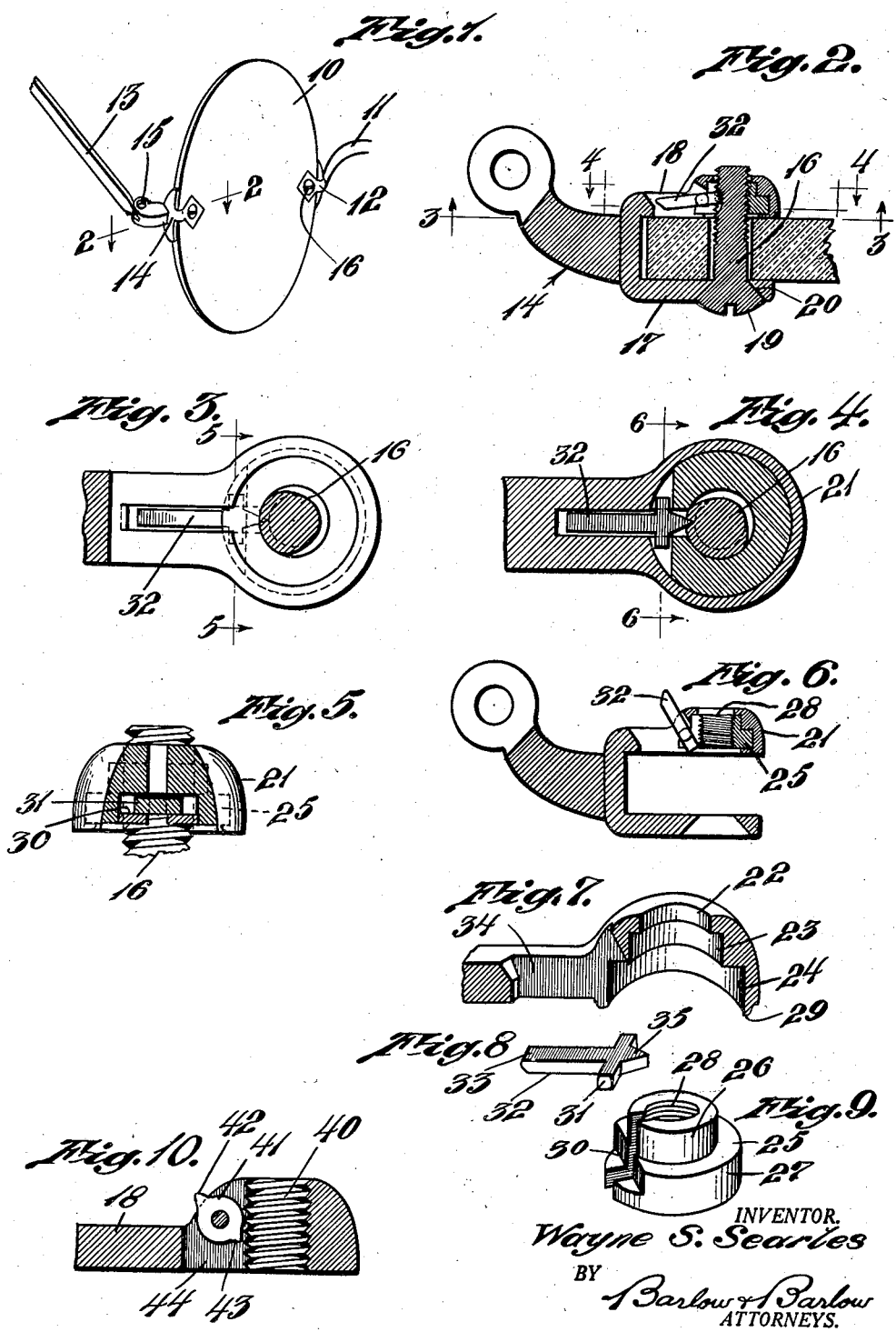
INVENTOR.
Wayne S. Searles
BY
Barlow & Barlow
ATTORNEYS.

Patented Dec. 4, 1934

1,983,500

UNITED STATES PATENT OFFICE 1,983,500

OPHTHALMIC MOUNTING

Wayne S. Searles, Providence, R. I., assignor to Universal Optical Corporation, Providence, R. I., a corporation of Rhode Island Application September 15, 1934, Serial No. 744,164

11 Claims. (Cl. 88—47)

This invention relates to an ophthalmic mounting and has for one of its objects the locking of a fastening screw or pin securely in place against turning or loosening movement.

Another object of the invention is the provision of locking means that may be readily moved from locking position to permit removal of the screw or pin from attaching position.

Another object of the invention is the provision of an entirely mechanical locking means and yet one which is more effective in enabling the screw to be moved to the desired position before the locking means is moved to lock the screw in position.

Another object of the invention is the provision of solderless means to secure an attaching pin or screw in the desired position against loosening.

Another object of the invention is the provision of locking means which will cut its own path into a member to hold the same in desired position.

Another object of the invention is the provision of locking means which will be completely housed in one of the arms or parts thru which the attaching screw or pin is positioned so as to be completely hidden from view.

Another object of the invention is the provision of locking means which will permit of ornamental configuration of the arm without any part protruding to interfere with or detract from such ornamental appearance.

Another object of the invention is the provision of locking means which will accommodate itself to varying diameters of screws.

Another object of the invention is a locking means which when forced into engagement with a screw of a loose fit in its threaded bearing, will force the same against one side of the bearing and provide a secure engagement which will tighten the same and hold it against loosening movement.

A further object of the invention is the provision of a lock affording ease in assembling and manipulation which is of importance in the manufacture and use of devices of this character.

With these and other objects in view, the invention consists of certain novel features of construction, as will be more fully described, and particularly pointed out in the appended claims.

In the accompanying drawing:

Fig. 1 is a perspective view of a lens showing several attaching screws in connection with which this locking means may be used.

Fig. 2 is a sectional view on line 2—2 of Figure 1, showing a fragmental portion of the lens.

Fig. 3 is a sectional view on line 3—3 of Figure 2.

Fig. 4 is a sectional view on line 4—4 of Figure 2.

Fig. 5 is a section on line 5—5 of Figure 3.

Fig. 6 is a section similar to Figure 2 with the lens and attaching screw omitted and showing a different position of the locking lever.

Fig. 7 is a perspective view of a fragmental portion of one arm.

Fig. 8 is a perspective view of the locking lever.

Fig. 9 is a perspective view of the threaded bushing.

Fig. 10 is a sectional view of one of the arms showing a modified construction and omission of the bushing, the threads being formed directly in one of the arms.

In the use of ophthalmic mountings there are many places where a pair of spaced arms are provided on one part which extend along the opposite sides of another part with a plain or threaded pin or screw extending thru the assembly and threadingly engaging one of the arms so as to hold these parts in assembled position and by reason of the head of the screw when used tend to move the arms toward each other to exert the desired pressure. One instance of such relation of parts is the strap which is secured to a lens. It is also desirable to provide a construction which will take up any looseness existing between the screw and its threaded bearings and the lock which I have provided accomplishes this and is such that it cuts for itself a path or keyway in the screw so that an accurate positioning of this keyway may be provided to conform with the location of the locking means and a matching of the two registering parts previously cut is not required but rather I may take up my screw as desired and when the pressure desired is attained then by merely manipulating my locking means I may lock the screw in the desired position. Also in so locking I provide a tension on the locking means so that it will not be readily moved from such locking position; and the following is a more detailed description of the present embodiment of this invention illustrating the preferred means by which these advantageous results may be accomplished:

With reference to the drawing, 10 designates a lens which is provided with straps 12 and 14 for mounting respectively a bridge 11 and a temple 13 by means of a screw 15. This lens is secured to each of the straps 12 and 14 by a screw 16 thus in this particular view I have illustrated three different locations of a pin or an attaching screw for securing different parts in position and I may use my locking means for locking each of these screws in position against a loosening movement. I have, however, chosen a strap for mounting the temple for a more detailed illustration of the lock of this invention.

The strap which is designated generally 14 is provided with a pair of arms 17 and 18 which have aligned openings for the reception of the screw 16 with its head 19 in a countersink 20 in the arm 17.

The arm 18 has an opening thru the thickened portion 21 consisting of several different sized bores represented by the reference numerals 22, 23 and 24 for the reception of a bushing 25 having one diameter 26 to fit the bore 23 and another diameter 27 to fit the bore 24 while the threaded opening 28 in the bushing is of a size to receive the threaded portion of the screw 16. This bushing is secured in the bore in this arm by rolling inwardly the protruding portion 29 about the bore 24 after the bushing has been inserted.

The bushing is cut away as at 30 to provide a recess for the reception of the trunnions 31 of the locking lever 32, the handle portion 33 of which lies within the recess or slot 34 in the arm 18 and this recess 30 with a portion of the bore 24 provides a pivotal bearing for the locking member 32 to be swung about the trunnion 31 as the pivotal axis so as to withdraw or project the cutting point or edge 35 thereof into the threads of the screw to cut away a portion forming a path or keyway in the screw to prevent the screw from turning in its openings.

In Fig. 6 I have illustrated the position of the locking lever permitting the screw to enter the threaded bearing 28. After the screw has been positioned and turned to provide the desired tension, the lever 32 will be swung to the position shown in Fig. 2, its cutting edge 35 removing some of the stock of the screw providing a keyway for itself in the threads of the screw and preventing the same from turning. The lever 32 is swung beyond a line directly at right angles to the axis of the screw as shown in Fig. 2 so that any pressure at right angles to the screw will cause this lever to move further into locking position rather than to release the same. This arrangement provides a simple construction permitting the screws to be taken up and a new cut made therein or permitting the replacement of the lens or other parts which they may secure.

The width of the lever is such that it will engage a full thread of the screw or will extend from one thread to the next thread thereby cutting its way into the parts of two threads for secure engagement. The length of the lever is greater than the radial dimension of the arm from the opening in the arm to its edge in a direction at right angles to the longitudinal extent of said arm. The lever is also of a length less than the length of said arm so as not to extend beyond the arm where it may be easily engaged to move it to released position.

In Fig. 10 I have illustrated a modified construction in which the threads 40 are provided directly in the arm 18, the bushing being omitted and I have provided a differently shaped lever 41 having a handle 42 and a cutting edge 43 which may be swung to any desired extent in a slot 44 in the arm.

These constructions permit the lens 10 to be inserted between the arms and the screw 16 to be tightened the desired amount without interference from the lock so that the workman may nicely feel the tension being given. After this is acquired the lock is then operated to hold the screw in its adjusted position from which it cannot move.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, spaced ears for receiving another part between them, a bushing in one of said ears cut away to provide a recess, and a lever having trunnions pivoted in the recess between said bushing and arm for swinging into engagement with the screw passing thru said bushing.

2. In an ophthalmic mounting, spaced ears for receiving another part between them, a threaded bushing in one of said ears having a slot therein and cut away on either side of said slot to provide a recess between said bushing and the arm in which it is mounted, and a lever having trunnions swingable thru said slot into engagement with a screw located in said bushing.

3. In an ophthalmic mounting, spaced ears for receiving another part between them, a threaded bushing in one of said ears having a slot therein and cut away on either side of said slot to provide a recess between said bushing and the arm in which it is mounted, a lever having trunnions swingable thru said slot into engagement with a screw located in said bushing, and a slot in said arm in line with the slot in said bushing to receive the handle portion of said lever.

4. In an ophthalmic mounting, spaced arms, a pin extending thru said arms, cooperating means between said pin and said arms to draw said arms toward each other, one of said arms being provided with an elongated slot extending from the arm opening longitudinally of the arm and a member pivoted in said slot, means to hold the pivoted member in the arm unitary with said arm, said member applying pressure when in working position on the pin to prevent rotation thereof.

5. In an ophthalmic mounting, an arm having an openng therein, a second arm spaced therefrom having a threaded opening therein, a screw having a head to engage the first arm and threads to engage the second arm for drawing said arms toward each other upon rotation of the screw, one of said arms provided with an elongated slot extending from the arm opening longitudinally of the arm and a member pivoted in said slot, means to hold the pivoted member in the arm unitary with said arm, said member applying pressure when in working position on the screw to prevent rotation thereof in either direction.

6. In an ophthalmic mounting, a rimless lens, a strap comprising a pair of arms, one extending along one side and one along the other side of said lens, registering openings in said lens and arms for the reception of a screw, one of said arms having a threaded opening, a screw having a head to engage the non-threaded arm and engaging said threaded opening, one of said arms provided with an elongated slot extending from the arm opening longitudinally of the arm and a member pivoted in said slot, means to hold the pivoted member in said arm unitary with said arm, said member applying pressure to the screw in a plane intercepting the axis of the screw.

7. In an ophthalmic mounting, spaced arms, a pin extending thru said arms, cooperating means between said pin and said arms to draw said arms toward each other, and a lever having laterally-extending trunnions for pivoting it in one of said arms, said lever having a portion extending towards said opening into the path of said pin and another portion extending in the opposite direction from said pivot and longitudinally of said arm for manipulation thereof, said lever lying in the plane of said arm when in locking position and being of a length greater than the radial dimension of the arm from the opening in said arm to its edge in a direction at right angles to the longtudinal extent of said arm and less than the length of said arm so as not to protrude therebeyond.

8. In an ophthalmic mounting, an arm having an opening therein, a second arm spaced therefrom having a threaded opening therein, a screw having a head to engage the first arm and threads to engage the second arm for drawing said arms toward each other upon rotation of the screw, one of said arms having a thickened portion about the opening therethrough with a slot therein extending longitudinally of said arm and locking means pivoted in said slot and unitary with said thickened arm for applying pressure on said screw, said means extending beyond the thickened portion and longitudinally of said arm.

9. In an ophthalmic mounting, spaced arms, a pin extending thru said arms, cooperating means between said pin and said arms to draw said arms toward each other, and a lever having laterally-extending trunnions for pivoting it in one of said arms, said lever having a portion extending towards said opening into the path of said pin and another portion extending in the opposite direction from said pivot for manipulation thereof, said lever lying in substantially the plane of said arm and longitudinally thereof when in locking position and being of a length less than the length of said arm so as not to protrude therebeyond, said arm being provided with a slot to receive said lever.

10. In an ophthalmic mounting, an arm having an opening therein, a second arm spaced therefrom having a threaded opening therein, a screw having a head to engage the first arm and threads to engage the second arm for drawing said arms toward each other upon rotation of the screw, a lever pivotally mounted in one of said arms with a portion extending into the opening for said screw and into the path of said screw and a portion extending in the opposite direction longitudinally of the arm for manipulation of said lever, said lever overlying a portion of said arm and in contact therewith when in locking position and means for holding said lever unitarily with said arm.

11. In an ophthalmic mounting, an arm having an opening therein, a second arm spaced therefrom having a threaded opening therein, a screw having a head to engage the first arm and threads to engage the second arm for drawing said arms toward each other upon rotation of the screw, a lever having laterally-extending trunnions pivotally mounted in one of said arms with a portion extending into the opening for said screw and into the path of said screw and a portion extending in the opposite direction longitudinally of said arm for manipulation of said lever, and holding means on said arm for said lever.

WAYNE S. SEARLES.